United States Patent [19]

Friend

[11] Patent Number: 5,386,882
[45] Date of Patent: Feb. 7, 1995

[54] WIRE ROPE CLEANING BRUSH APPARATUS

[76] Inventor: Jeff Friend, P.O. Box 2315, Alameda, Calif. 94501

[21] Appl. No.: 161,419

[22] Filed: Dec. 6, 1993

[51] Int. Cl.⁶ .................. F16N 7/16; A46B 15/00; B21B 45/02
[52] U.S. Cl. .................. 184/15.3; 184/15.1; 15/256.6
[58] Field of Search .............. 184/15.1, 15.2, 15.3; 15/88, 88.1, 256.6, 40

[56] References Cited

U.S. PATENT DOCUMENTS

| | | | |
|---|---|---|---|
| 2,951,557 | 9/1960 | Jung | 184/102 |
| 3,905,452 | 9/1975 | Schirmer . | |
| 3,931,991 | 1/1976 | Marchello | 184/15.1 |
| 4,216,846 | 8/1980 | Wheeler . | |
| 4,422,208 | 12/1983 | Rohrbaugh . | |
| 4,498,558 | 2/1985 | Bendahan | 184/15.1 |
| 4,543,683 | 10/1985 | Goldman . | |
| 4,570,285 | 2/1986 | Skelton . | |
| 4,891,037 | 1/1990 | Maples | 184/15.1 |
| 5,020,637 | 6/1991 | Hoenselaar et al. | 184/15.1 |
| 5,036,563 | 8/1991 | Liebing . | |
| 5,213,180 | 5/1993 | Masonek | 184/15.3 |

FOREIGN PATENT DOCUMENTS

| | | | |
|---|---|---|---|
| 9102189 | 2/1991 | European Pat. Off. | 184/15.1 |
| 2142928 | 8/1973 | Germany | 184/15.1 |

*Primary Examiner*—Thomas E. Denion
*Attorney, Agent, or Firm*—Harris Zimmerman

[57] ABSTRACT

A wire rope cleaning brush assembly designed to clean elevator and hoist wire rope and cable includes a U-shaped frame having opposed legs, each leg configured to support a generally rectangular rope cleaning brush. The brushes are disposed with their bristle tips converging at a nominal plane, and the wire ropes and cable translate in the nominal plane to be cleaned by the bristles as the wire rope is moved past the brushes by actuation of the elevator hoist. A pair of cap plates are removably secured to the U-shaped frame, each plate securing one of the brushes. The plates and the frame include holding pins extending toward the brushes to retain the brushes fixedly in the U-shaped frame. The confronting bristle tips impinge on the moving wire rope, and apply sufficient force to remove dirt and corrosion from the valleys as well as the crowns of the wire braids and strands. The reversible operation of the elevator hoist assures that the wire ropes are drawn through the bristles both with and against the "grain" of the brushes, providing a thorough cleaning of the wire rope. Moreover, the wire rope is cleaned constantly through operation of the hoist, so that it is maintained in a clean state and does not undergo cycles of dirt buildup followed by periodic cleaning. A rope lubricator may be secured to a lubricator mounting plate which both supports the rope lubricator and retains a brush within the frame assembly.

14 Claims, 3 Drawing Sheets

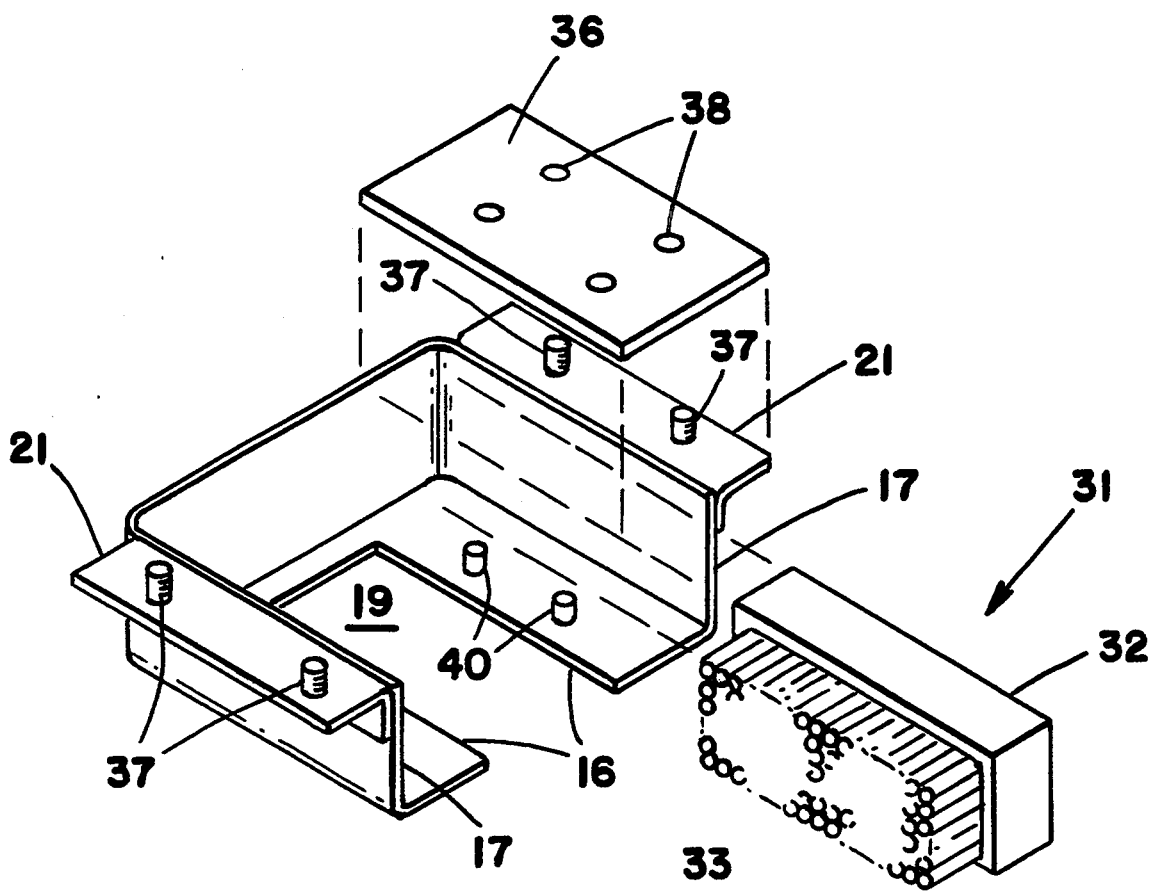
FIG_1
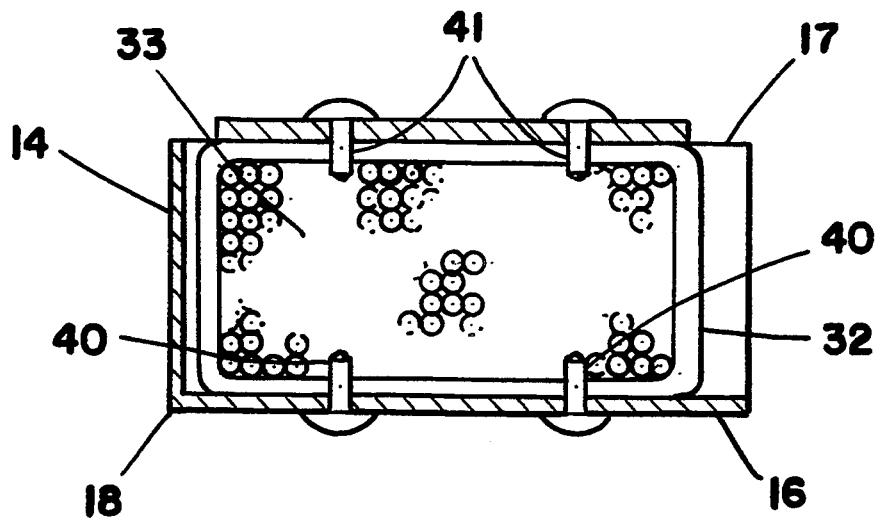
FIG_4

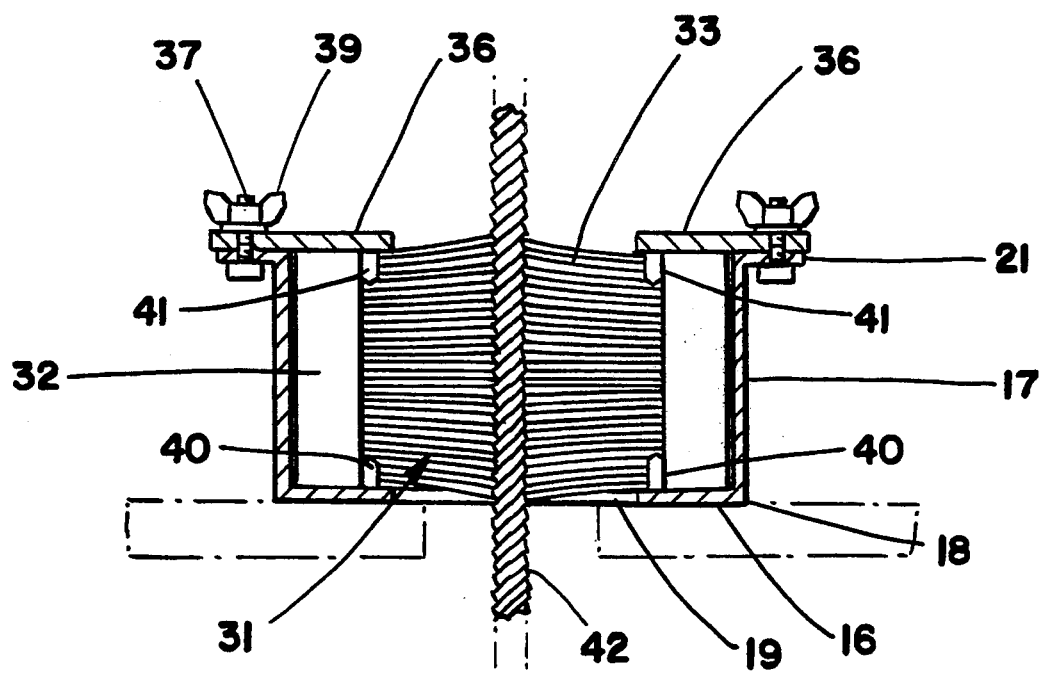
FIG_2
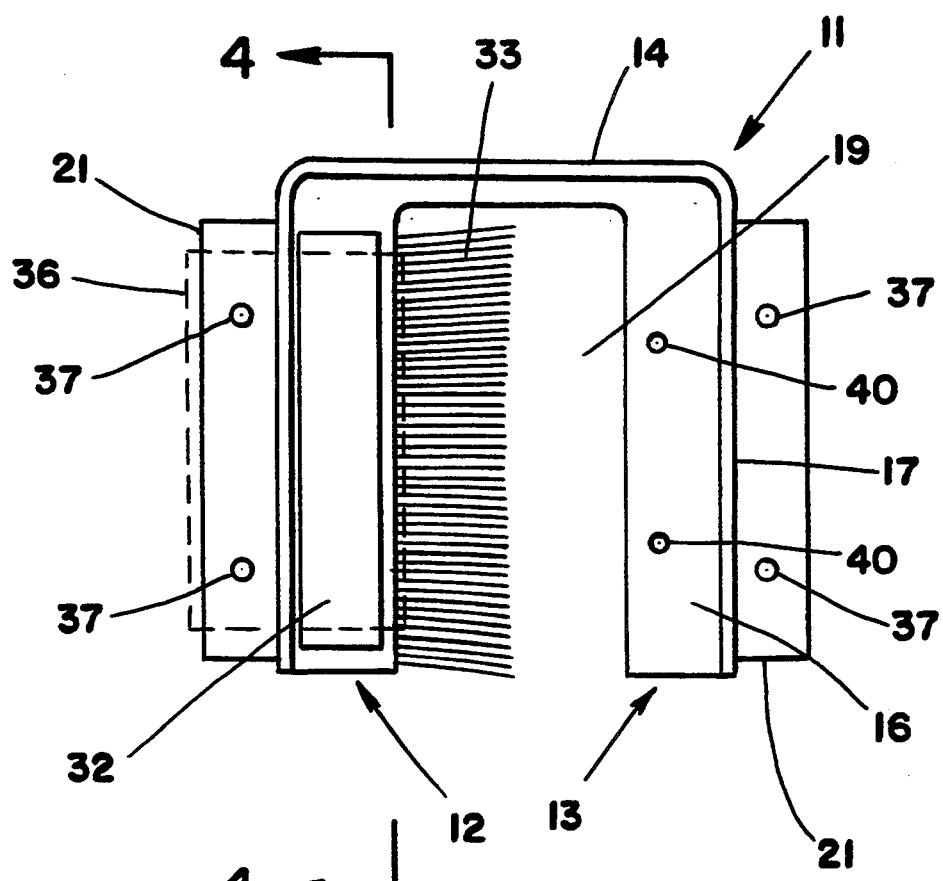
FIG_3

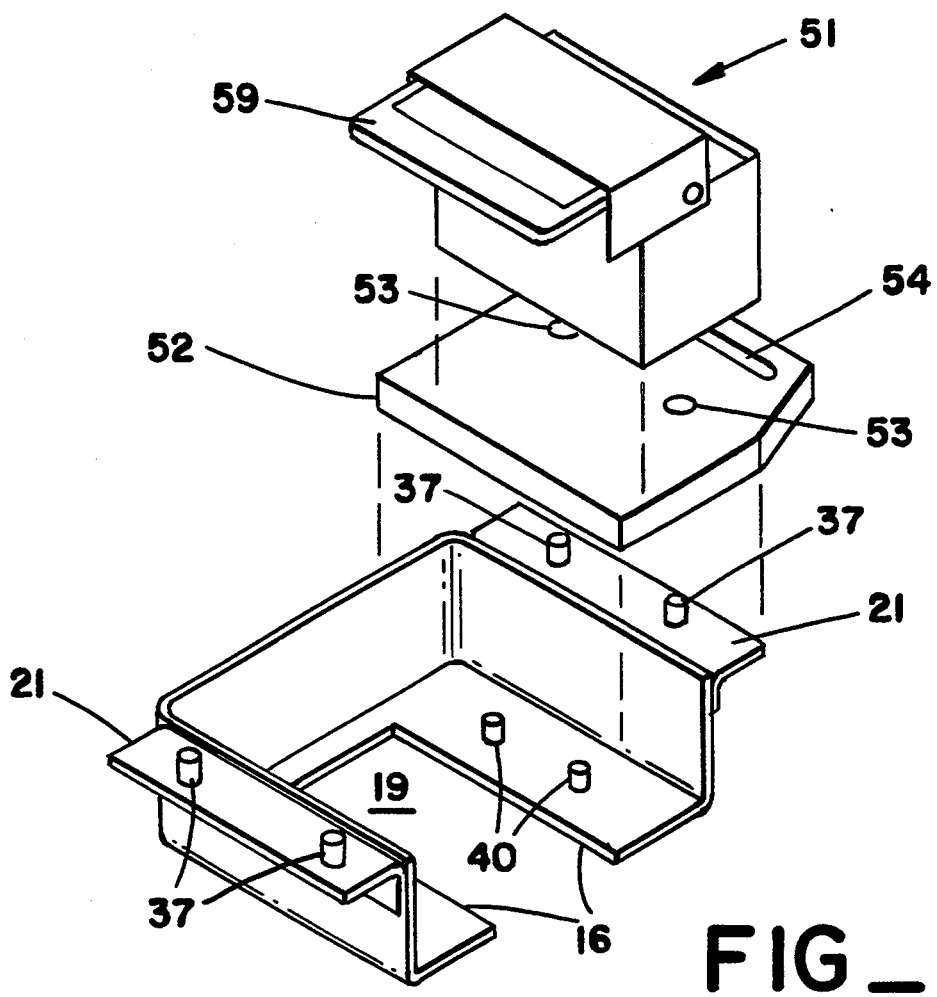
FIG_5
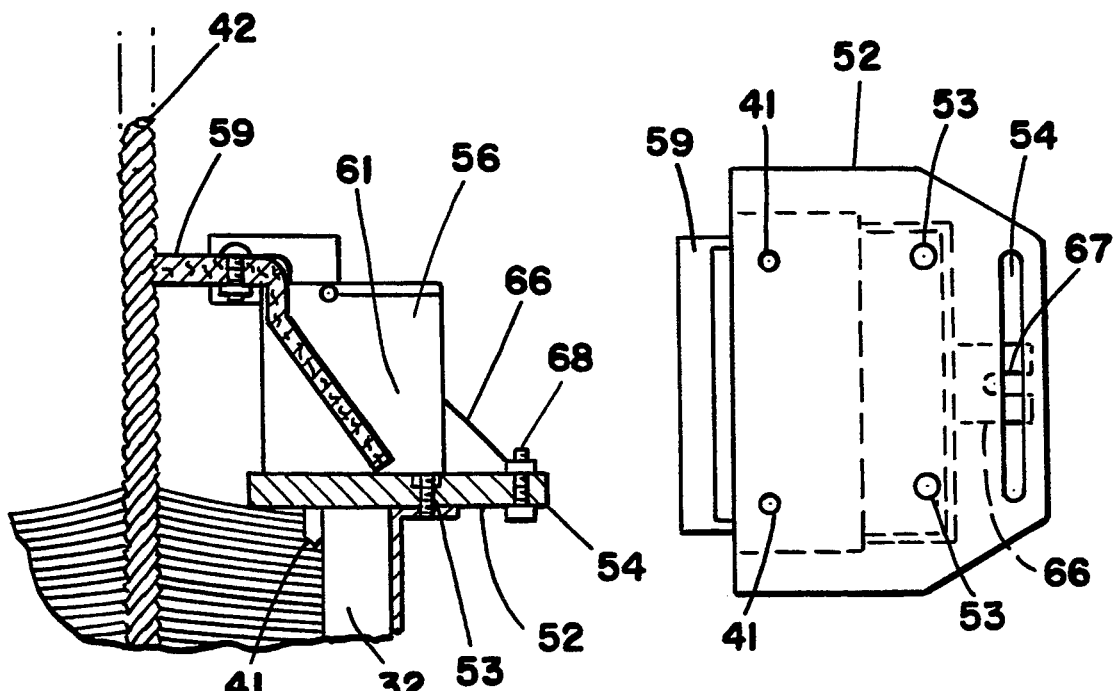
FIG_6  FIG_7

WIRE ROPE CLEANING BRUSH APPARATUS

BACKGROUND OF THE INVENTION

Wire cable and wire rope are used extensively in the constructions of elevators and hoists in environments as disparate as mine shafts and office building hoistways. It is recognized that the wire rope and cable must be inspected and maintained regularly to assure the safety of the passengers and freight carried by the lift cars. Generally speaking, the maintenance includes cleaning the wire cable and rope to remove any buildup of corrosion, dirt, dust, and solidified lubricant. The buildup of such substances can rapidly increase wear and reduce flexibility, and lead to early replacement or sudden failure.

It has been commonplace in the industry to clean wire ropes and cable by manual effort, using rags, cable lubricant, and a wire hand brush. This is an arduous, time consuming job that can require two days for a single, low rise elevator installation. Mechanical cable cleaning arrangements have been proposed in the prior art, but have not found success in the field. Such devices may employ rotating brushes or rotating housings to move a cleaning brush relative to the braided wire, or may use radially segmented cleaning assemblies to remove dirt and corrosion from the cable strands and braids. The fact that these cleaning devices comprise mechanical, moving assemblies implies that the cleaning devices must also be maintained and inspected to assure that they are working properly, and must also be maintained regularly.

SUMMARY OF THE PRESENT INVENTION

The present invention generally comprises a wire rope cleaning assembly designed to clean the elevator hoist wire ropes passively as the cable or rope is used in the elevator installation. Thus the invention maintains the cleanliness of the wire rope without involving any moving mechanism, thereby increasing the durability and longevity of the wire rope. Furthermore, it reduces or eliminates the need to clean the hoist ropes manually, thus saving labor costs and down-time of the hoist or elevator.

The wire rope cleaning assembly includes a U-shaped frame having opposed legs, each leg configured to support a generally rectangular rope cleaning brush. The brushes are disposed with their bristle tips converging at a nominal plane, and the wire ropes extend in the nominal plane to be cleaned by the bristles as the wire rope is moved past the brushes by actuation of the elevator hoist or car. A pair of cap plates are removably secured to the U-shaped frame, each plate securing one of the brushes. The plates and the frame include holding pins extending toward the brushes, and impinging on the brush blocks to retain the brushes fixedly in the U-shaped frame.

The confronting bristle tips impinge on the moving wire rope, and apply sufficient force to remove dirt and corrosion from the valleys as well as the crowns of the wire braids and strands. The reversible operation of the elevator hoist assures that the wire ropes are drawn through the bristles both with and against the "grain" of the brushes, providing a thorough cleaning of the wire rope. Moreover, the wire rope is cleaned constantly through operation of the hoist, so that it is maintained in a clean state and does not undergo cycles of dirt buildup followed by periodic cleaning. Thus the maintenance of the wire rope is enhanced with respect to prior art manual cleaning and cleaning devices.

The assembly further includes an optional wire rope lubricator mounting plate that is removably securable to the U-shaped frame. Each cap plate may be replaced by the lubricator mounting plate, which includes holding pins to retain the respective brush, and also includes a slot extending therethrough. The lubricator, known in the prior art, comprises a rectangular coffer retaining liquid lubricant, and a lubricant applicator tongue extending from the coffer to the wire rope(s). A foot extending from the rectangular coffer includes a slot that intersects the slot of the lubricator mounting plate, and a threaded fastener extends through the slots to removably secure the lubricator on the mounting plate. Thus the invention permits lubrication of the wire ropes as they are cleaned by the brushes.

BRIEF DESCRIPTION OF THE DRAWINGS

FIG. 1 is an exploded perspective view of the wire rope cleaning brush apparatus of the present invention.

FIG. 2 is an end elevation of the wire rope cleaning brush apparatus shown in FIG. 1.

FIG. 3 is a plan view of the U-shaped frame of the wire rope cleaning apparatus as shown in FIGS. 1 and 2.

FIG. 4 is a cross-sectional elevation taken along line 4—4 of FIG. 3.

FIG. 5 is an exploded perspective view of a further embodiment of the invention in which a lubricator assembly is also mounted on the U-shaped frame of the invention.

FIG. 6 is a side elevation depicting the lubricator mounting plate of the invention supporting a prior art wire rope lubricator.

FIG. 7 is a bottom plan view of the lubricator mounting plate depicted in FIGS. 5 and 6.

DESCRIPTION OF THE PREFERRED EMBODIMENT

The present invention generally comprises a wire rope cleaning brush assembly designed to clean elevator hoist wire rope passively as the rope is translated through the brushes during operation of the elevator installation. With regard to the accompanying FIGS. 1–4, the cleaning brush assembly includes a U-shaped support frame 11 comprised of a pair of legs 12 and 13 extending generally orthogonally from opposed ends of a central web member 14. The legs are disposed in generally parallel, spaced apart relationship and formed in enantiomorphic manner with respect to a plane of symmetry extending therebetween. Each leg is configured as a right angle channel member having a bottom wall 16 and orthogonal side wall 17 extending from a continuous edge 18. A central rope passage 19 is defined by the confronting, opposed legs 12 and 13. A broad flange 21 extends orthogonally from a respective top edge of the sidewall 17 of each leg.

The apparatus further includes a pair of rope cleaning brushes 31. Each brush 31 is comprised of a rectangular block housing 32 and a plurality of bristles 33 extending from one side of the housing generally parallel array. Each leg 12 and 13 is dimensioned to accept a rope cleaning brush 31, as best shown in FIG. 2, with the base of each brush impinging on a sidewall of a respective leg 12 or 13, and the bristles 33 disposed to converge tip-to-tip at the plane of symmetry of the frame 11. The brush bristles thus extend laterally across the central rope passage 19. The bristles are preferably formed of stiff, resilient wire or palmyra, though other similar materials may be used as in known in the art.

The brushes 31 are retained in the frame 11 by a pair of cap plates 36 adapted to be secured to the flanges 21 of the frame. A pair of threaded posts 37 extend upwardly from each flange 21, and a pair of holes 38 formed in each cap plate 36 are dimensioned to receive the threaded posts. Locking nuts or wing nuts 39 are secured to each threaded post 37 to secure the cap plates 36 with the housing 32 of each brush 31 essentially clamped between the cap plate 36 and the bottom wall 16 of the leg 12 or 13.

The apparatus may further include holding pins to secure the brushes. Each bottom wall 16 includes a pair of spaced apart holding pins 40 extending upwardly therefrom, and each cap plate 36 includes a pair of spaced apart holding pins 41 extending downwardly therefrom. Each brush 31 is held behind the respective pair of pins impinging on the side walls of the block housing 32. The holding pins 40 and 41 of each leg assembly 12 or 13 and cap plate 36 thus fasten the brushes more securely in each leg assembly.

With regard to FIG. 2, the frame 11 is disposed so that one or more wire ropes 42 extend through the central rope passage 19 and encounter the bristles 33 of the brushes 31. The wire rope(s) 42 extend generally along the plane of symmetry of the frame 11, so that the opposed tips of the bristles 33 impinge resiliently and forcefully on the wire rope. The frame 11 may be secured at any of several mounting locations in the hoist system, depending on the type of roping system. For example, the mounting locations may include the machine room, the live side of the counterweight sheave, or the live side of the crosshead sheave, so that a maximum amount of rope passes through the bristles 33 and is cleaned thereby.

It may be noted that the wire rope 42 will move bi-directionally and somewhat randomly during operation of the elevator or hoist, causing the wire rope 42 to be drawn reversibly through the bristles 33 to undergo brush cleaning in both directions. The bristle tips clear the valleys of the wire braids as well as the crests, providing superior cleaning effect.

The brushes 31 may be removed and replaced periodically, as the bristles become filled with dirt and grease. Brushes that are installed in conjunction with clean ropes have been found to require replacement only after many months of continuous use. The apparatus described provides continuous cleaning of the wire ropes without requiring any moving parts, thus eliminating the possibility of mechanical failure and assuring the proper maintenance and cleanliness of the wire ropes.

A further embodiment of the invention, depicted in FIGS. 5–7, includes an optional mounting plate 52 to support a lubricator assembly 51(known in the prior art) for applying rope lubricant to the wire rope(s) 42. Either of the cap plates 36 may be removed from the apparatus and replaced by a lubricator support plate 52. The plate 52 is larger and thicker than the cap plate to provide a base for the lubricator assembly 51. The plate 52 includes a pair of holes 53 for receiving the threaded posts 37, so that the plate 52 may be secured atop a respective one of the flanges 21, and a pair of holding pins 41 extending downwardly to retain a respective brush 31 within the apparatus. The plate 52 further includes a slot 54 extending longitudinally therein to secure the lubricator in adjustably positionable fashion, as explained below.

The lubricator assembly 51 comprises a generally rectangular coffer defining an upwardly opening reservoir 56. A lubricant applicator 59, comprised of a fibrous web such as heavy duty felt or the like, extends to contact the wire rope(s) 42 that pass through the apparatus, and the inner portion of the applicator 59 is immersed in liquid rope lubricant 61 within the reservoir 56. The wicking action of the material that forms the applicator draws lubricant 61 from the reservoir 56 as lubricant is applied to the wire ropes, so that the lubricating action is continuous and uniform.

A foot 66 extends from a lower wall portion of the lubricator, and includes a slot 67 formed therein. The slot 67 intersects the slot 54 of the supporting plate, and a threaded fastener 68 extending through both slots secures the lubricator to the mounting plate and the apparatus. The lubricator may be positioned as required along the longitudinal extent of the slot 54 to engage the wire ropes.

Thus the apparatus described herein may be used both to clean the wire ropes and to lubricate the same ropes as they pass through the apparatus. These tasks are accomplished with no moving parts and no mechanism, so that the optimal effect is achieved in the simplest manner at the lowest cost.

I claim:

1. A wire rope cleaning assembly, including;
    a pair of rope cleaning brushes, each of said brushes including a plurality of bristles disposed in generally parallel array;
    frame assembly means for supporting said pair of brushes with said bristles of said brushes in confronting, tip-to-tip relationship and mutually impinging at a nominal plane;
    said wire rope extending in said nominal plane and translatable through said bristles to clean said wire rope;
    a generally U-shaped open frame having a pair of opposed, spaced apart legs, each of said legs configured to support and retain one of said pair of brushes; and,
    a pair of cap plates, and means for securing each of said cap plates to one of said legs and to secure one of said pair of brushes to a respective one of said legs.

2. The wire rope cleaning assembly of claim 1, wherein said pair of legs are disposed in spaced apart, parallel fashion in a common plane, said common plane intersecting said nominal plane in generally orthogonal fashion.

3. The wire rope cleaning assembly of claim 1, wherein each of said legs includes a right angle channel portion dimensioned to receive one of said brushes.

4. The wire rope cleaning assembly of claim 1, wherein said means for securing each of said cap plates includes a pair of flanges, each extending from a portion each of said right angle channel portions.

5. The wire rope cleaning assembly of claim 4, further including a pair of threaded posts extending from each of said flanges, and a pair of holes formed in each of said pair of cap plates for receiving a like pair of threaded posts from a respective flange.

6. The wire rope cleaning assembly of claim 5, further including a pair of threaded nuts removably securable to each of said pair of threaded posts to fasten each of said cap plates to one of said flanges with one of said brushes disposed between the respective cap plate and a portion of the respective right angle channel portion.

7. The wire rope cleaning assembly of claim 1, further including holding pin means for fixedly fastening said pair of brushes in said right angle channel portions.

8. The wire rope cleaning assembly of claim 7, wherein said brushes each include a brush block housing, and said holding pin means include a pair of holding pins extending from each of said right angle channel portions to impinge in said bristles of a respective brush.

9. The wire rope cleaning assembly of claim 8, further including a pair of holding pins extending from each of said pair of cap plates and disposed to impinge in said bristles of each of said pair of brushes.

10. The wire rope cleaning assembly of claim 1, further including means for applying lubricant to said wire rope extending in said nominal plane.

11. The wire rope cleaning assembly of claim 10, wherein said means for applying lubricant includes a lubricator mounting plate for securing a rope lubricator to said frame assembly and also securing one of said pair of rope cleaning brushes to said frame assembly.

12. The wire rope cleaning assembly of claim 11, wherein said mounting plate includes a longitudinal slot extending therein, and said lubricator includes a foot having a foot slot extending therein, said foot slot and said longitudinal slot disposed in confronting and intersecting fashion, and threaded fastener means extending through said foot slot and said longitudinal slot to secure said lubricator assembly to said support plate.

13. The wire rope cleaning assembly of claim 12, wherein said lubricator mounting plate further includes a pair of brush holding pins extending therefrom to engage a respective brush.

14. The wire rope cleaning assembly of claim 13, further including a pair of threaded posts extending from said frame assembly means, and a pair of holes formed in said lubricator mounting plate and disposed to receive said threaded posts to secure said lubricator mounting plate to said frame assembly means.

* * * * *